J. L. WOODBRIDGE.
SYSTEM OF ELECTRICAL DISTRIBUTION.
APPLICATION FILED JULY 29, 1909.

964,830.

Patented July 19, 1910.

WITNESSES:
Rob. R. Ketchel.
Frank C. French.

INVENTOR
Joseph L. Woodbridge
BY
Augustus B. Stoughton
ATTORNEY.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

964,830.   Specification of Letters Patent.   Patented July 19, 1910.

Application filed July 29, 1909. Serial No. 510,223.

*To all whom it may concern:*

Be it known that I, JOSEPH LESTER WOODBRIDGE, a citizen of the United States, and a resident of Philadelphia, in the county of Philadelphia and State of Pennsylvania, have invented a certain new and useful System of Electrical Distribution, of which the following is a specification.

My invention relates to systems of distribution in which a storage battery is operated in parallel with generating apparatus to relieve said apparatus of quick fluctuations of load, and in which apparatus is provided for gradually transferring the slower fluctuations of load from the battery to the generator apparatus. Such a system is described in Patent No. 895,760, issued to Robert C. Hull, under date of August 11th, 1908, and also in Patent No. 895,825, issued to me under date of August 11th, 1908. In the latter patent I have shown means for preventing the further transfer of load from the battery to the generator apparatus when the load on the latter has reached a predetermined value. In the present invention I provide another kind of device for accomplishing this same result.

The nature of my invention will be more clearly understood by reference to the following description taken in connection with the accompanying drawings, in which—

Figure 1:
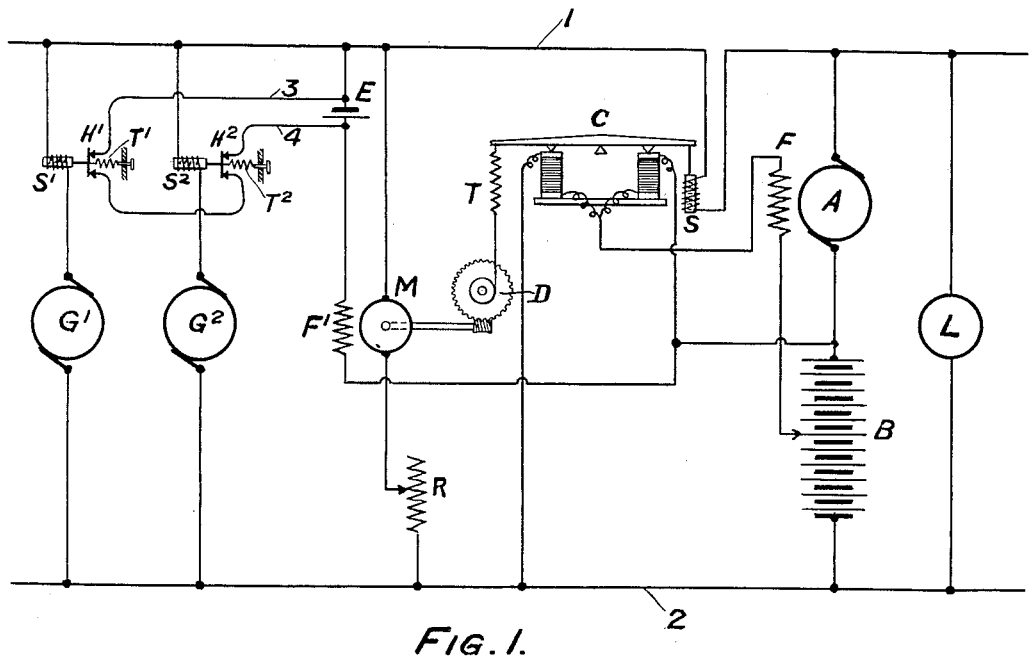
Figure 2:
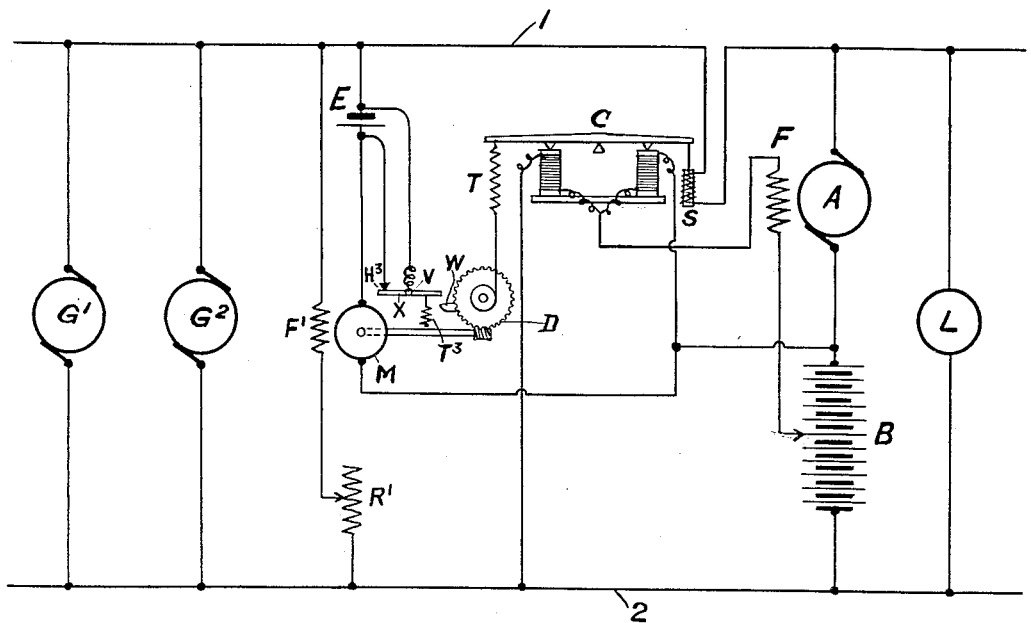

Figure 1, shows one embodiment of the invention, and Fig. 2, shows a modification.

In Fig. 1, $G^1$ and $G^2$, are generators supplying current to the circuit 1—2 to which is connected a variable load L. A storage battery B with its booster A is connected across the circuit 1—2, and the charge and discharge of the battery are controlled by the carbon regulator C. This is a well known piece of apparatus which controls the current in the field F of the booster in response to small fluctuations of current in the solenoid S connected into the conductor 1 which carries the total output of the generators. The pull of the solenoid S on the lever of the carbon regulator is balanced by a spring T at the other end of the lever whose tension determines the average load on the generators in the well known manner since it must always be practically balanced by the pull of the solenoid S. Any increase of tension of the spring T will cause a corresponding increase of load on the generators. The tension of the spring T is adjusted by means of the worm gear D operated by the motor M. The armature of the motor is connected across the circuit 1—2 through a resistance R so that a practically constant current is transmitted through this armature. The field $F^1$ of the motor is connected across the terminals of the booster A and will cause the motor to run in one direction or the other according to the polarity of the booster and will cause the motor to stop when the booster voltage is zero. This apparatus will therefore, as described in the previous patents above referred to, tend to gradually bring the battery back to a floating condition if it has been caused to charge or discharge by a variation of load at L, the variation of load being slowly transferred from the battery to the generators.

In series with the field $F^1$ of the motor M is an electrolytic valve E, constructed for example in the well known manner by immersing a plate of aluminum and one of iron in a suitable electrolyte. This cell has the well known property of permitting current to flow in one direction but preventing a flow in the opposite direction. This cell is normally short-circuited by the conductors 3—4 and the contacts $H^1$ and $H^2$. These contacts are held in a closed position by the adjustable springs $T^1$ and $T^2$, but may be opened by the solenoids $S^1$ and $S^2$ connected respectively to the circuits of the generators $G^1$ and $G^2$. The contacts $H^1$ and $H^2$ are in series so that when either is opened the short circuit around the cell E will be opened. It follows, therefore, that at some predetermined load on the generator $G^1$ or the generator $G^2$, the solenoid $S^1$ or $S^2$ as the case may be, will overpower the corresponding spring $T^1$ or $T^2$ and open the short circuit around the cell E. This cell is connected in the direction to prevent the flow of current through the field $F^1$ which drives the motor M in the direction to increase the load on the generators, so that when the short circuit around the cell E is opened the motor can no longer operate to increase the load on the generators and any further increase of load at L will be taken by the battery. If, however, the load at L should decrease below the average load of the generators and the battery should begin to charge, reversal of booster voltage will send current through the field $F^1$ in the opposite direction and the cell E will not prevent the flow of current in this direction so that the motor will be free to operate in the direction to relieve the generators of a part of their load. This will release the cores of the solenoids S¹ and S² and restore the contacts H¹ and H² or either of them which may have been opened, thus closing the short circuit around the cell E and restoring the apparatus to its original condition.

In Fig. 2, a modification is shown, in which the short circuit around the cell E is opened at some predetermined aggregate load on the generators but not by any predetermined load on an individual machine. This result is accomplished by a contact H³ at one end of a lever X which is pivoted at V. The other end of the lever is arranged to engage with a cam W on the worm gear D. Normally the contact at H³ is held closed by the spring T³. As the load increases and the motor M revolves the worm gear D in the direction to increase the tension of the spring T a point is reached where the cam W strikes the lever X and opens the contact at H³. The cell E will then prevent the further operation of the motor M in this direction as described in connection with Fig. 1, and no more load can be thrown on the generators. A reduction of load, however, as already described will reverse the voltage of the booster A and the cell E will permit the flow of current in the opposite direction, thus allowing the motor to operate in the reverse direction and relieve the generators of load, at the same time permitting the lever X to return to its normal position with the contact H³ closed.

Another modification is included in Fig. 2, in that the field F¹ of the motor M is supplied with constant current from the circuit 1—2 through the rheostat R¹ while the armature of the motor is connected across the booster terminals through the electrolytic cell E. That is, the two motor circuits, armature and field, are interchanged. This modification, however, does not alter the general method of operation.

It will be understood that many other modifications of the details of the invention may be made without departing from the spirit thereof.

What I claim and desire to secure by Letters Patent is:

1. In combination, an electric circuit and its generating source, translating devices constituting a variable load, a storage battery connected across the circuit, electroresponsive regulating apparatus for controlling the charge and discharge of the battery, a device responsive to departures from a predetermined condition in the battery-branch and adapted to restore that condition, an electrolytic valve arranged to prevent the operation of said device in one direction, and means for closing a short-circuit around said valve when the load on the generating source is on one side of a predetermined value and opening said short-circuit when said load is on the other side of said value.

2. In combination, an electric circuit and its generating source, translating devices constituting a variable load, a storage battery connected across the circuit, electroresponsive regulating apparatus for controlling the charge and discharge of the battery, a device responsive to departures from a predetermined condition in the battery branch and adapted to restore that condition by the transfer of load between the battery and the source, an electrolytic valve arranged to prevent the operation of said device in the direction to increase the load on the source but permit its operation in the opposite direction, and means for closing a short circuit around said valve when the load on the source is less than a predetermined amount and opening said short-circuit when said load exceeds that amount.

3. In combination, an electric circuit and its generating source, translating devices constituting a variable load, a storage battery connected across the circuit, electroresponsive regulating apparatus for controlling the charge and discharge of the battery, a device adapted to restore a predetermined electrical condition in the battery branch, said device including a motor having separate field and armature circuits whereof one is supplied with substantially constant current while the other is arranged to respond to departures from said predeterminded electrical condition, an electrolytic valve in the latter circuit and means for closing a short circuit around said valve when the load on the generating source is less than a predetermined amount and opening said short circuit when said load exceeds that amount.

4. In combination, a generating source, a branch circuit connected thereto containing a battery and its booster, regulating apparatus for the booster field adapted to control the division of load between the generating source and the battery, a motor for operating said regulating apparatus having separate armature and field circuits, means for transmitting substantially constant current through one of said circuits, connections from the other to a portion of the battery branch including the booster, an electrolytic valve in the latter circuit, and means for closing a short circuit around said valve when the load on the source is less than a predetermined value and opening said short circuit when said load exceeds that value.

5. In a system of electrical distribution the combination of generating apparatus and a storage battery and its complemental booster and booster regulator operating to relieve the generating apparatus of quick fluctuations of load and to gradually transfer slower fluctuations of load from the battery to the generating apparatus, with an electrolytic valve operatively arranged in respect to the booster for limiting such transfer of load to the generating apparatus.

6. In a system of electrical distribution the combination of generating apparatus, a storage battery operatively arranged to relieve the generating apparatus of quick fluctuations of load and a controlling device for gradually transferring slower fluctuations of load from the battery to the generating apparatus, with an electrolytic valve operatively arranged with respect to the controlling device for limiting such transfer.

In testimony whereof I have hereunto signed my name.

JOSEPH LESTER WOODBRIDGE.

Witnesses:
S. E. PATTERSON,
FRANK E. FRENCH.